UNITED STATES PATENT OFFICE.

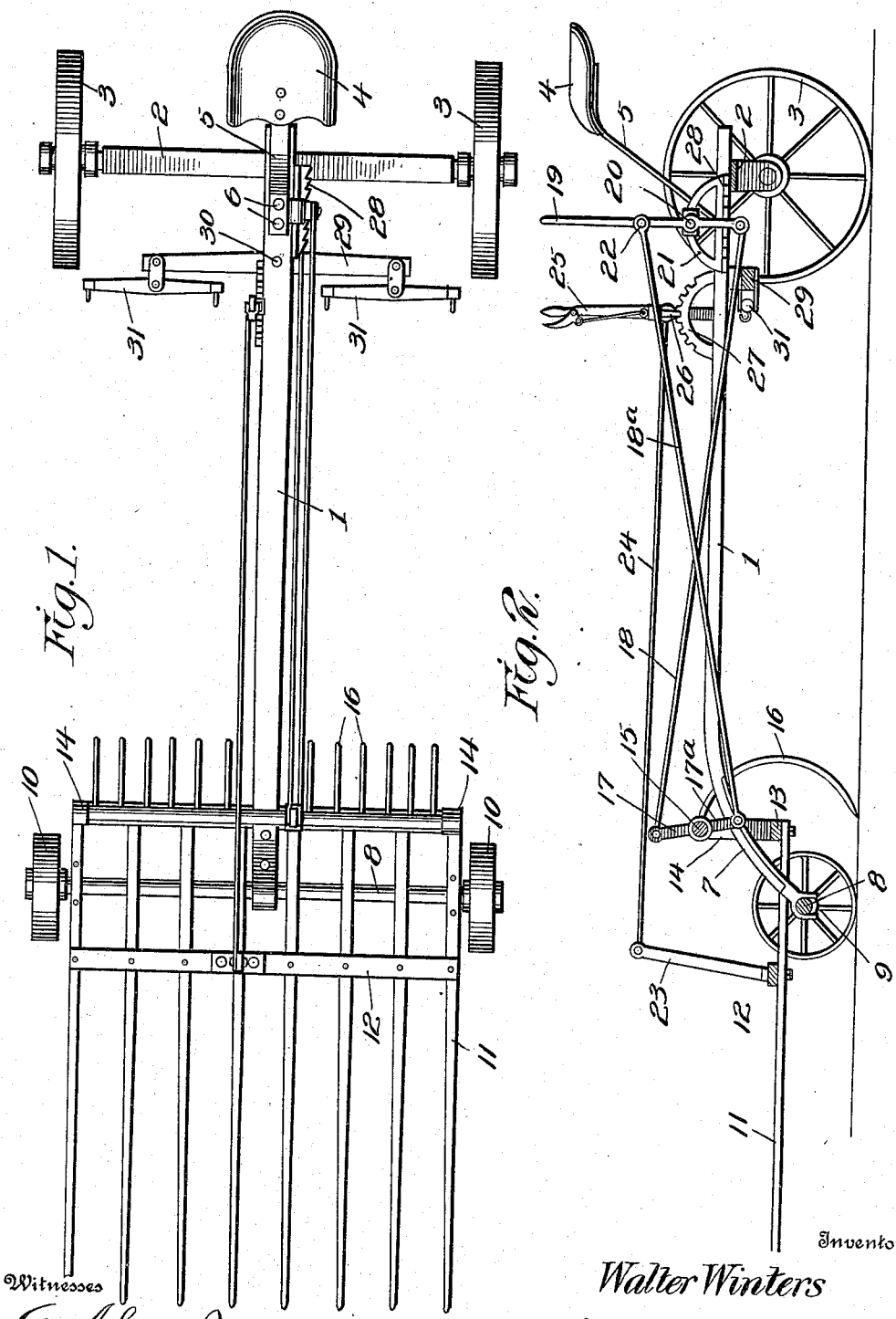

WALTER WINTERS, OF TRYON, NEBRASKA.

HAY-RAKE.

932,528. Specification of Letters Patent. Patented Aug. 31, 1909.

Application filed October 21, 1908. Serial No. 458,901.

*To all whom it may concern:*

Be it known that I, WALTER WINTERS, a citizen of the United States of America, residing at Tryon, in the county of McPherson and State of Nebraska, have invented new and useful Improvements in Hay-Rakes, of which the following is a specification.

This invention relates to hay rakes, and one of the principal objects of the same is to provide an adjustable rake for a hay sweep which shall be simple in construction and efficient in operation.

Another object is to provide a hay sweep or fork which may be rocked upon a wheel support to throw the points of the teeth toward and from the ground.

These and other objects may be attained by means of the construction illustrated in the accompanying drawing, in which,—

Figure 1 is a plan view of a hay rake made in accordance with my invention. Fig. 2 is a longitudinal sectional view of the same.

Referring to the drawing, the numeral 1 designates a draft tongue mounted upon a suitable arched axle 2, upon which the ground wheels 3 are journaled at the rear of the tongue. A suitable driver's seat 4 is supported upon a spring bar 5 secured at 6 to the tongue 1. The front end of the tongue 1 is downwardly curved, as at 7, and is centrally connected to an axle 8 by means of a suitable clip 9. The axle 8 has mounted upon its ends the wheels 10 for supporting the hay rake and sweep. Supported upon the axle 8 is the hay sweep 11 comprising the forwardly projecting tines connected by a cross bar 12 and at the rear by a similar cross bar 13. Rising from the cross bar 13 is a suitable bracket 14, one at each end, and extending from one to the other is a rock shaft 15 to which the rake teeth 16 are secured. Connected centrally to the shaft 15 is a two-armed lever, one arm 17 of which extends above the shaft, and connected thereto is a rod 18 extending rearwardly and connected to the lower end of the lever 19 pivoted at 20 to a segment 21. Extending below the shaft 15 is the arm $17^a$ of the lever, to which is connected a rod $18^a$, the front end of which is pivoted to the lever 19 at 22.

Extending upward from the cross bar 12 is a standard 23, and pivoted at the upper end of said standard is a connecting rod 24, the rear end of which is pivoted to a lever 25 journaled at the side of the tongue 1, said lever being provided with a spring pawl 26 designed to engage a segment rack 27. A toothed rack 28 for the lever 19 is secured at the side of the tongue. A doubletree 29 is pivoted at 30 to the tongue, said doubletree carrying swingletrees 31.

The operation of my invention may be briefly described as follows: As the machine is moved from place to place, the sweep 11 may be raised and lowered by means of the lever 25, while the rake may be readily raised and lowered by means of the lever 19.

My invention is of simple construction, will operate smoothly under varying conditions and is strong, durable and efficient.

I claim:—

1. A hay rake comprising a rear axle, a draft tongue mounted upon said axle, wheels journaled to said axle a front axle, wheels on said axle, the front end of said tongue being secured centrally to said front axle, a hay sweep, means for raising and lowering said sweep, a hay fork pivoted above the rear end of the sweep, and means for raising and lowering said rake.

2. A hay rake comprising a draft tongue mounted on wheels, a sweep mounted upon the front axle, a cross bar on said sweep, a standard secured to said cross bar, a lever, a connecting rod pivoted to said standard and extending to said lever for raising and lowering said sweep, a hay rake, a two-armed lever, an operating lever, and connecting rods extending from said two-armed lever to said operating lever.

In testimony whereof I affix my signature in presence of two witnesses.

WALTER WINTERS.

Witnesses:
L. C. RENEAU,
LILLIE M. RENEAU.